(12) United States Patent
Jia et al.

(10) Patent No.: US 8,837,780 B2
(45) Date of Patent: Sep. 16, 2014

(54) GESTURE BASED HUMAN INTERFACES

(75) Inventors: Charles Jia, San Diego, CA (US); Lynn M. Eades, San Diego, CA (US); Laurel Lasslo, San Diego, CA (US); Christopher Arrioia, Jersey City, NJ (US); Michael Stephen Rose, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 155 days.

(21) Appl. No.: 13/531,270

(22) Filed: Jun. 22, 2012

(65) Prior Publication Data
US 2013/0343601 A1    Dec. 26, 2013

(51) Int. Cl.
*G06K 9/00* (2006.01)

(52) U.S. Cl.
USPC .......................................................... 382/103

(58) Field of Classification Search
None
See application file for complete search history.

(56) References Cited

U.S. PATENT DOCUMENTS

| | | | |
|---|---|---|---|
| 7,023,536 B2 | 4/2006 | Zhang et al. | |
| 7,038,846 B2 | 5/2006 | Mandella et al. | |
| 7,088,440 B2 | 8/2006 | Buermann et al. | |
| 7,110,100 B2 | 9/2006 | Buermann et al. | |
| 7,113,270 B2 | 9/2006 | Buermann et al. | |
| 7,161,664 B2 | 1/2007 | Buermann et al. | |
| 7,203,384 B2 | 4/2007 | Carl et al. | |
| 7,268,956 B2 | 9/2007 | Mandella et al. | |
| 7,474,809 B2 | 1/2009 | Carl et al. | |
| 7,729,515 B2 | 6/2010 | Mandella et al. | |
| 7,826,641 B2 | 11/2010 | Mandella et al. | |
| 7,961,909 B2 | 6/2011 | Mandella et al. | |
| 2003/0113018 A1* | 6/2003 | Nefian et al. | 382/181 |
| 2004/0036764 A1* | 2/2004 | Hirota | 348/77 |
| 2005/0168437 A1 | 8/2005 | Carl et al. | |
| 2006/0010400 A1* | 1/2006 | Dehlin et al. | 715/856 |
| 2008/0170776 A1* | 7/2008 | Albertson et al. | 382/154 |
| 2009/0091710 A1* | 4/2009 | Huebner | 353/28 |
| 2010/0027843 A1* | 2/2010 | Wilson | 382/103 |
| 2010/0053151 A1* | 3/2010 | Marti et al. | 345/419 |
| 2010/0295782 A1 | 11/2010 | Binder | |
| 2011/0080337 A1* | 4/2011 | Matsubara et al. | 345/156 |
| 2011/0110560 A1 | 5/2011 | Adhikari | |
| 2011/0227915 A1 | 9/2011 | Mandella et al. | |
| 2011/0243380 A1* | 10/2011 | Forutanpour et al. | 382/103 |
| 2012/0027252 A1 | 2/2012 | Liu et al. | |
| 2012/0033856 A1* | 2/2012 | Flagg et al. | 382/103 |
| 2012/0038549 A1 | 2/2012 | Mandella et al. | |
| 2012/0076353 A1* | 3/2012 | Large | 382/103 |
| 2013/0004016 A1* | 1/2013 | Karakotsios et al. | 382/103 |
| 2013/0194418 A1 | 8/2013 | Gonzalez-Banos et al. | |

FOREIGN PATENT DOCUMENTS

WO    WO-2011045789    4/2011

OTHER PUBLICATIONS

"A Hand Gesture Recognition System for Replacing a Mouse"; Dec. 3, 2006; http://www.youtube.com/watch?v=J_dLfvh3zs4.
"Real-time Hand Motion/gesture Detection for HCI—Demo 1"; Dec. 17, 2008; http://www.youtube.com/watch?v=sEGY6MyPqsY& feature=related.

(Continued)

*Primary Examiner* — Shervin Nakhjavan

(57)    ABSTRACT

A method for implementing gesture based human interfaces includes segmenting data generated by an IR camera of an active area and detecting objects in an active area. The objects are distinguished as either island objects or peninsula objects and a human hand is identified from among the peninsula objects. The motion of the human hand is tracked as a function of time and a gesture made by the human hand is recognized.

13 Claims, 7 Drawing Sheets

Edge Detection, Island/Peninsula

(56) References Cited

OTHER PUBLICATIONS

Gao, Rui et al; Microsoft Research-Mobile Surface; Microsoft Research; 2010; http://research.microsoft.com/en-us/projects/mobilesurface/.
Hand, Randall; Infinite Z Launches zSpace Virtual Holographic 3D Display for Designers; VizWorld.com; Dec. 13, 2011; http://www.vizworld.com/2011/12/infinite-launches-zspace-virtual-holographic-3d-display-designers/#sthash.j6Ys61PX.dpbs.
Harrison, Beverly & Ziola, Ryder; Bringing Toys to Life: Intel Labs OASIS Project, Augmented Engineering; Jan. 26, 2011; http://augmentedengineering.wordpress.com/2011/01/26/bringing-toys-to-life-intel-labs-oasis-project/.
Harrison, Chris et al; OmniTouch: Wearable Multitouch Interaction Everywhere; UIST'11; Oct. 16, 2011;. Santa Barbara, California; http://research.microsoft.com/en-us/um/people/awilson/publications/HarrisonUIST2011/HarrisonUIST2011.html.
Hartmann, Bjorn et al; Pictionaire: Supporting Collaborative Design Work by Integrating Physical and Digital Artifacts; CSCW 2010; Feb. 6, 2010; Savannah, Georgia; http://research.microsoft.com/en-us/um/people/awilson/publications/HartmannCSCW2010/HartmannCSCW2010.html.
Hinckley, Ken et al; Pen + Touch = New Tools; USTI'10; Oct. 3, 2010; New York, New York; http://research.microsoft.com/en-us/um/people/awilson/publications/HinckleyUIST2010/HinckleyUIST2010.html.
Izadi, Shahram et al; C-Slate: A Multi-Touch and Object Recognition System for Remote Collaboration Using Horizontal Surfaces; IEEE; 2007; http://research.microsoft.com/pubs/132551/cslate1.pdf.
Junuzovic, Sasa et al; M;crcsoft Research-IllumiShare; Microsoft Research; 2012; http://delivery.acm.org/10.1145/2210000/2208333/p1919-junuzovic.pdf?p=15.219.153.76&id=2208333&acc=ACTIVE%20SERVICE&KEY=C2716FEBFA981EF153FE223D54A46A411F9E1F05F1DA5F38&CFID=271558808&CFTOKEN=96334302&_acm_=1387226323_00af7aa5e159c7c67d724c49ef01bacf.
Kane, Shaun K. et al; Bonfire: A Nomadic System for Hybrid Laptop-Tabletop Interaction; UIST'09; Oct. 4, 2009; Victoria, British Columbia, Canada; http://dub.washington.edu/djangosite/media/papers/uist09.pdf.
Linder, Natan et al; LuminAR: Portable Robotic Augmented Reality Interface Design and Prototype; UIST'10, Oct. 3, 2010; New York, New York; http://fluid.media.mit.edu/sites/default/files/2010-10-03-luminar_uist1O_demo.pdf.
Melanson, Donald; Microsoft Research Working on Portable Surface; Mar. 2, 2010; http://www.engadgetcom/2010/03/02/microsoft-research-working-on-portable-surface/.
Melanson, Donald; Wiimote Repurposed for Multi-Point Interactive Whiteboard; Dec. 10, 2007; http://www.engadget.com/2007/12/10/wiimote-repurposed-for-multi-point-interective-whiteboard/.
Simonite, Tom; A Kitchen Countertop With a Brain; MIT Technology Review; Jul. 2, 2010; http://www.technologyreview.com/news/419639/a-kitchen-countertop-with-a-brain/.
Wilson, Andrew D. et al; Combining Multiple Depth Cameras and Projectors for Interactions On, Above, and Between Surfaces; U1ST'10; Oct. 3, 2010; New York, New York; http://research.microsoft.com/en-us/um/people/awilson/publications/WilsonUIST2010/WilsonUIST2010.html.
Wilson, Andrew D.; Using a Depth Camera as a Touch Sensor; ITS 2010: Devices & Algorithms; Nov. 7, 2010; Saarbrucken, Germany; http://research.microsoft.com/en-us/um/people/awilson/publications/WilsonITS2010/WilsonITS2010.html.

\* cited by examiner

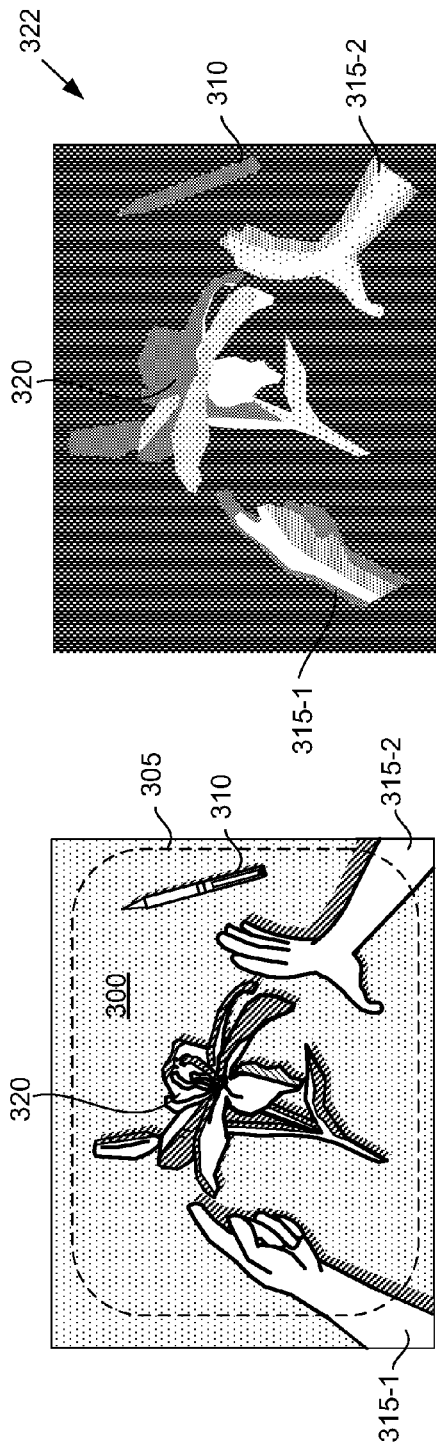
Fig. 3A
Fig. 3B
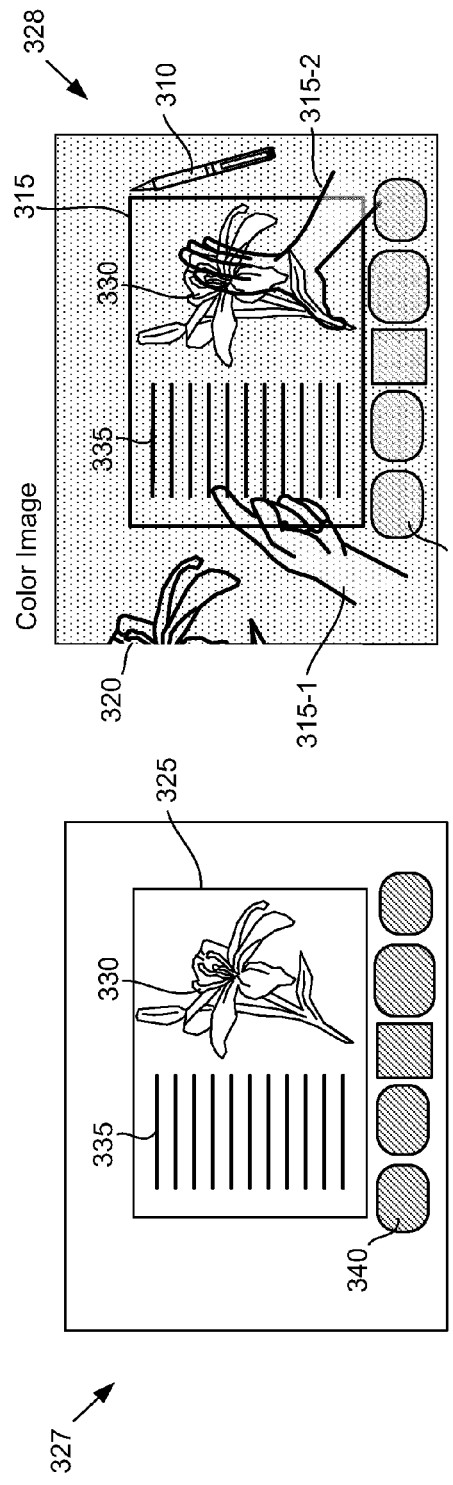
Fig. 3C
Fig. 3D

IR Camera Image

Edge Detection, Island/Peninsula

GESTURE BASED HUMAN INTERFACES

BACKGROUND

Gestures using the arm and hand are a fundamental and universal form of nonverbal communication between humans. Human gestures such as pointing out an object, waving to say hello, or curling a finger to signal someone else to come closer are all examples of gestures that communicate meaning between humans. A gesture based Human Interface Device (HID) is a computer device that accepts input from humans and produces a corresponding command to the computer. These devices may be used in situations wherein a user desires an alternative to mouse, keyboard, touch pads, or other devices. However, creating human interface devices based on optical sensing of human gestures can be challenging for a number of reasons. For example, it can be difficult to distinguish the human hands/arms from the background, inanimate objects, or projected light. Once the human hands/arms are sensed, the computer can track their motion and interpret gestures to produce commands.

BRIEF DESCRIPTION OF THE DRAWINGS

The accompanying drawings illustrate various examples of the principles described herein and are a part of the specification. The illustrated examples are merely examples and do not limit the scope of the claims.

FIGS. 3A-3F are diagrams of data generated a HID system and the use of the data in distinguishing hands/arms from background and projected images, according to one example of principles described herein.

Throughout the drawings, identical reference numbers designate similar, but not necessarily identical, elements.

DETAILED DESCRIPTION

Gesture based Human Interface Devices (HID) can be used to replace or supplement human interaction through keyboards, styluses, touch pads and other devices. The principles below describe a HID system that includes a number of sensors to detect hand geometry and motion in an active area. Specific gestures are derived from the hand geometry and motion. These gestures are translated into commands that drive the functionality of computing applications. In general, the principles include hand image segmentation using at least one of: an IR camera image, skin tone detection, and motion based detection. A contour based analysis can be applied to refine hand information and extract a descriptor of the hand gesture. A list of target gestures is defined. Gestures can be recognized from the descriptor based on data from pre-training of a recognition algorithm with the target gestures. Unintentional hand/arm movements are rejected. The identification of hand, the location of the hand and/or features of the hand, and gesture type can be fed into an application through a defined interface.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an example" or similar language means that a particular feature, structure, or characteristic described in connection with the example is included in at least that one example, but not necessarily in other examples.

The principles below may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. Examples of computer readable storage mediums would include, but are limited to, the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Figure 1:
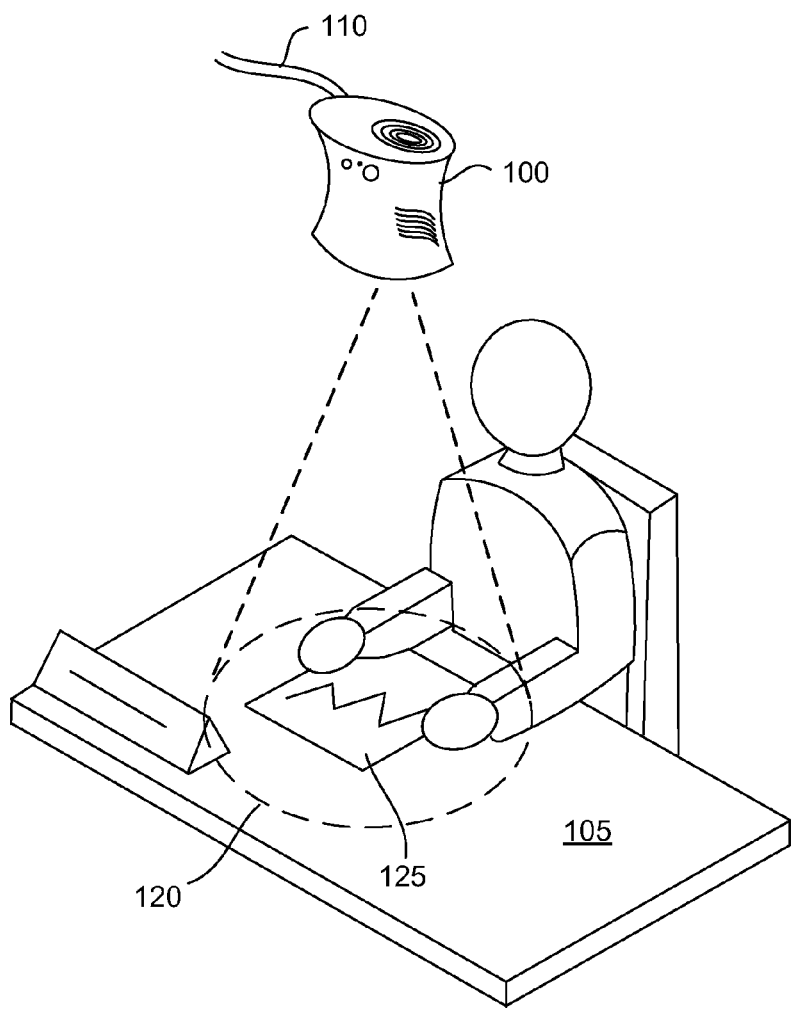
FIG. 1 is a diagram of a Human Interface Device (HID) system in use, according to one example of principles described herein.

FIG. 1 is a diagram of a Human Interface Device (HID) system (100) in use. In this implementation, the HID system (100) is mounted over a working surface (105) and has a number of sensors that detect objects and motion on (or above) the working surface. The HID system may also project information using a visible light projector onto the work surface and objects on the work surface. In general, the sensors and projector are operable within a defined area called an active area (120). In this example, the HID system (100) has projected a graph (125) onto the working surface (105). The working surface may be any suitable solid or non-solid surface, including walls, floors, ceilings, desks, water surfaces, or any other desired surface. The user may now manipulate the presentation of the graph, the underlying data, or other parameters using gestures and/or other communication techniques. For example, the user could use hand gestures to enlarge portions of the graph, explore trends, or assemble a presentation. The HID system (100) recognizes the hand gestures and translates them into commands to effectuate the desired action. The HID system (100) also includes cabling (110) for power and/or communication.

The implementation described above is only one example. A variety of other implementations could be used. For example, the active area may not be over a work surface. Instead, one of the sensors of the HID system may be placed in front of a user so that another party can see the face of the user as the user speaks.

Figure 2:
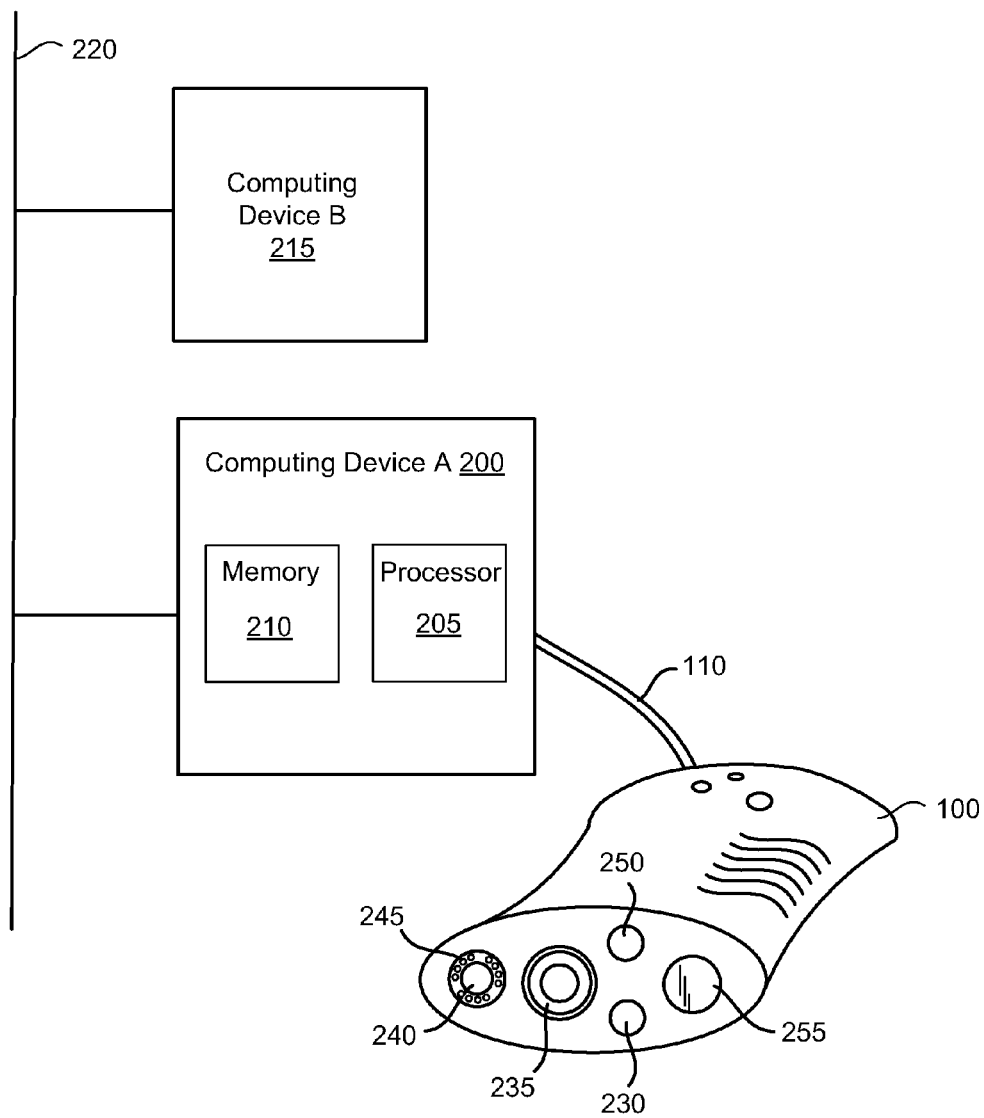
FIG. 2 is a diagram of a HID system that includes sensor/projector unit and a computing device, according to one example of principles described herein.

FIG. 2 is a perspective view of the HID system (100) showing the surface that includes the sensors, projector, and other elements that are directed towards the working surface.

In this example, the HID system (100) includes a visible light projector (235), a depth camera (250), a visible color camera (230) and an IR camera (240) with a number of IR illumination elements (245). The visible light projector (235) may include a number of controllable parameters that can be manually adjusted by the user or automatically adjusted by the HID system (100). For example, the user or HID system may turn the power ON/OFF, blank, dim, focus, adjust color balance, and perform any number of other actions that adapt the projector to a given situation.

The depth camera (250) can operate on any of a number of principles, including time of flight (TOF) principles. For example, the depth camera (250) may operate by generating a pulse of light that bounces off objects in front of the depth camera (250) and returns to the depth camera to be sensed. In some implementations, the depth camera (250) may include a near IR light source to generate the light pulses. For example, the light source (255) may include IR and/or visible light elements to illuminate the scene on the work surface. In other examples, all or a portion of the IR light may be generated by the IR illumination elements (245) that are associated with the IR camera.

The IR camera (240) may be a near, mid, or far IR camera and the illumination elements (245) may be appropriately matched to provide the desired illumination. For example, if the IR camera is in the near or mid-IR wavelengths, the illumination elements (245) may be appropriately selected IR LEDs that provide illumination to the scene on the work surface. The IR LEDs may have a number of different operating wavelengths or may all have the same wavelength or range of wavelengths. For example, if it is desirable to have two specific wavebands of illumination to more accurately discriminate between objects in the scene, the IR LEDs may be divided into two wavelength groups to provide the desired illumination. The IR camera may also include at least one optical filter to allow the illumination from the IR LEDs to be sensed but to reject other frequencies of light. In some examples, the IR camera may sense and compare two separate IR wavelengths to better distinguish the hands/arms of a user. Where the IR camera is operating in the far-IR, no further illumination is necessary because objects at room temperature are emitters of IR radiation at these frequencies.

The HID device may also include a color camera that provides relatively high resolution color image data. This high resolution color image data can be used for a variety of purposes, including imaging and identifying objects on or near the active area of the device.

The HID system can contain its own internal computational processing and memory. Additionally or alternatively, the HID system may be connected to external computing devices, such as computing device A (200) and computing device B (215). These computing devices can be connected to the HID system in a number of ways including through wired or wireless networking. In FIG. 2, a cable (110) connects the HID to the computing device A (200). The two computing devices (210, 215) are connected using a wired network (220). These external computing devices (200, 215) may supply additional computing power to assist in the operation of the HID, develop data products based on the output of the HID, or operate applications that are controlled by the HID. They may also perform a number of other functions to support and/or control the functionality of the HID device.

The description and elements above are just one example of a HID system. A variety of other HID systems could be created to implement principles described herein. For example, the HID systems could add a sensor (such as an ultrasonic sensor) or eliminate a sensor (such as the depth sensor).

Figure 3E:
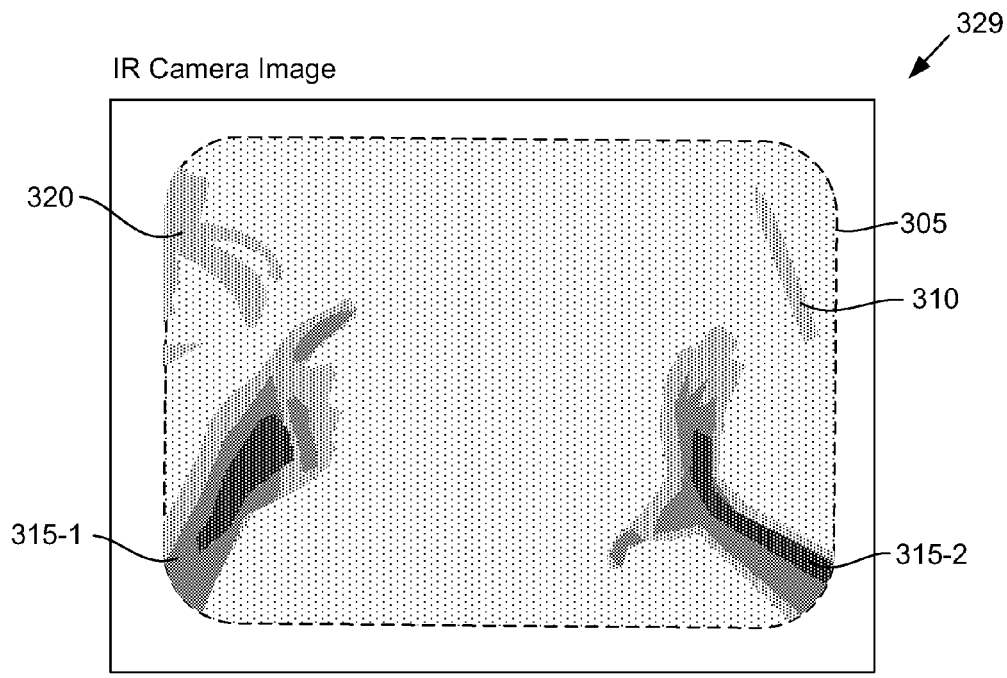

FIGS. 3A-3E are diagrams of data generated by the HID system and show the use of the data in distinguishing hands/arms from background and projected image. FIG. 3A shows the real objects that are placed on or over the work surface (300) and within the active area (305). In this example, the objects in the active area (305) include a pen (310), a flower (320), and the user's hands (315). In this example, the user has found a flower (320) and wants to identify it and then share an image and description of the flower.

The depth camera (250, FIG. 2) creates the image (322) shown in FIG. 3B where different shading represents the height contours of the objects. In this example, the data from the depth camera is shown with objects or portions of objects that are closer to the depth camera displayed as light areas and objects that are farther away from the depth camera displayed as darker areas. In some examples, the depth camera may sense the work surface and set the work surface as a reference datum. The reference datum can then be used to calibrate the other depth data. In this example, the pen (310) has a relatively low profile and consequently has dark shading. The hands (315) and flower (320) have a number of color gradients, with darker portions being farther away from the depth camera and lighter portions being closer to the depth camera.

FIG. 3C shows the image (327) produced by the projector (235, FIG. 2). In this example, the HID system (100), in response to input from the user, has taken a picture of the flower (320, FIG. 3A) with the visible camera (230, FIG. 2), identified the flower, retrieved textual information (335) describing the flower, and projected an image (330) of the flower next to the text (335). The HID system has organized the text (335) and the image of the flower (330) within a frame (325). The projected image (327) also includes a number of control areas (340) that may have associated functionality.

FIG. 3D shows a color image (328) taken by the color camera (230, FIG. 2). The color image (328) is a combination of the light reflected by the real objects present in the active area (306, FIG. 3A) and the projected image (327). As shown in the color image, the user has moved the real flower (320) to one side so that only a few of the petals of the flower are still visible extending from the left portion of the image. The projected image (327, FIG. 3C) is projected over the real objects in the active area (the user's hands and the pen). As can be seen from the color image (328), the projection of an image over the real objects can tend to obscure the real objects and make identification and motion detection of the real objects more challenging.

FIG. 3E shows an IR image (329) generated by the IR camera (240, FIG. 2). In this example, the IR camera senses light in the near IR range and is much less sensitive to visible light. As discussed above, the IR camera may incorporate optical filters to reject unwanted optical energy. In some examples, the wavelength of IR light is selected to have a high reflectivity from human skin. This can increase the contrast between hands that would be expected to gesture and other objects in the active area. In some implementations, an IR absorbing coating or layer may be placed over the work surface. This coating absorbs a significant portion of the incident IR energy to increase the contrast between objects over/on the work surface and the work surface itself. In other examples, two IR wavelengths can be selected, a first wavelength with relatively high reflectivity from human skin and a second wavelength with relatively low reflectance from human skin. The two IR wavelengths may be in the near IR, which covers optical wavelengths between approximately 750 nanometers through 1.4 micrometers. For example, at wavelengths between 750 to 850 nanometers, human skin may have relatively high reflectivity (between 0.7 and 0.9). At optical wavelengths of around 970 nanometers, the reflectance of human skin decreases significantly. By selecting two different wavelengths, the differences in the two measurements can be used to increase the reliability of detecting human skin.

Figure 3F:
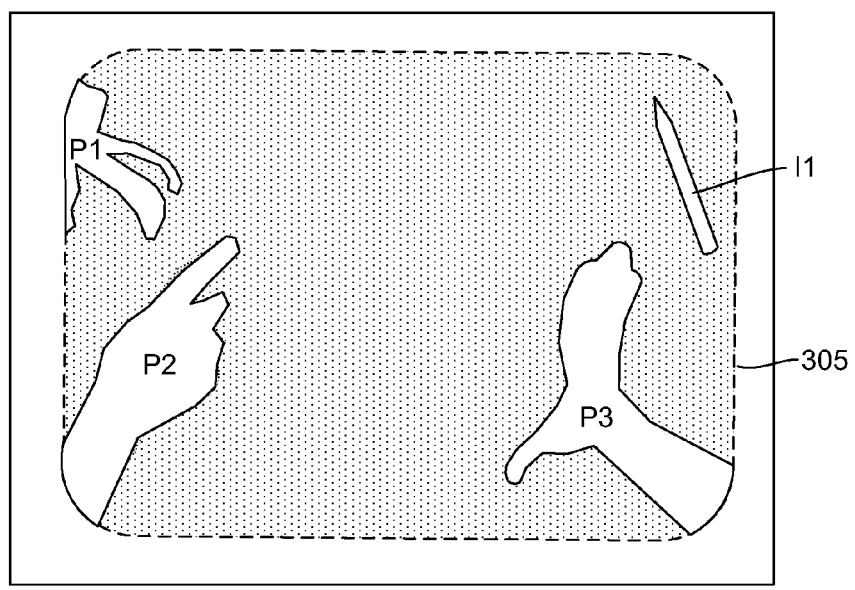

FIG. 3F shows one example of edge detection and recognition of objects within the active area of the HID device. Edge detection can be performed from a variety of data sources, including the depth images, visible images, and IR images. Each of these data sources may have advantages and disadvantages. Combinations of the various data sources can be used to significantly improve the reliability of the edge detection algorithm. The edge detection using the depth images may be accurate in identifying objects that have significant height but may be less effective in clearly showing boundaries. The depth camera may have significantly lower resolution than the other sensors. Additionally, boundaries of an object in some cases may not be accompanied by large changes in height that can be detected by the depth camera. For example, the depth camera may not be sensitive enough to detect a folder or sheet of paper lying on the working surface. Additionally, while the depth sensor may be able to very accurately detect the location of the bulk of a user's hand, the depth sensor may be less effective in identifying the precise boundaries of the hand or small motions/positions of the fingers of the hand.

Data from the color camera can be very high resolution and may contain data on a variety of different wavelengths of light (red, green, blue). However the data from the color camera may be disrupted by the presence of a projected image. A variety of techniques could be used to solve this challenge. For example, the intensity, color and location of each pixel in the projected image are known. After the color image of both the real objects and overlaid projected image is taken, the projected image could be subtracted from the color image. This would emphasize the real objects. Distortions of the projected image as it falls across the real objects would become apparent following the subtraction. These distortions could be used as an indicator of a real object. Additionally, the color data in the image could be used to identify skin tones to assist in discriminating between inanimate objects and skin tones that potentially indicate a human hand. In some examples, the projector could be momentarily dimmed or blanked while a color image is taken. This could occur so quickly that the user does not perceive a flicker in the projected image.

Data from the IR camera could be very effective in edge finding. The IR camera may have relatively high resolution and is not adversely affected by visible light. Consequently, the projection of visible light on real objects is not sensed by the IR camera. Additionally, a number of schemes could be used to improve the detection of objects without disrupting the user's experience. For example, an IR light pattern, such as a grid could be projected onto the objects. Distortions in the grid could be used to indicate the presence of an object. Additionally or alternatively, a pattern could be painted or otherwise deposited onto the working surface that has different reflectance in the IR but little effect in the visible region. For example, a checkerboard pattern that is visible to the IR camera—but not to the visible camera or to the human eye—could be placed on the work surface. Elements that obstruct the pattern could be assumed to be objects. Thus, the high resolution of the IR camera and its immunity to visible light, coupled with the low light capabilities inherent in the IR camera/illumination system may make the data generated by the IR camera particularly effective for edge finding.

After the edges of the objects are identified, the objects are classified as either "islands" or "peninsulas." Islands are objects that have a perimeter edge that is entirely within the active area. For example, the pen (310, FIG. 3E) has an edge that is entirely within the active area. Consequently, the pen has been labeled as "I1" in FIG. 3F, representing "Island 1." In general, objects that are identified as islands are not expected to make gestures and consequently can be disregarded during gesture recognition. This early identification of island objects can significantly reduce the computational requirements needed to correctly identify gestures by eliminating some or most candidate objects.

If an object has an edge that intersects the border of the active area (305), it is classified as a peninsula. In this example, hands are necessarily peninsulas because the hands are attached to and animated by arms, which in turn are connected to the human torso. Consequently, to the first order, objects that are peninsulas should be further considered to determine which, if any of the objects is a human hand/arm that would generate gestures that need to be interpreted. In the example shown in FIG. 3F, three peninsulas have been identified. The flower has several petals that extend from the border of the active area and are labeled as "P1" for peninsula 1. The user's left hand is labeled as "P2" and the user's right hand is labeled as "P3". Thus, the HID system has three candidates to analyze. In some implementations, the peninsulas may be further categorized. For example, skin tones may be derived the color camera data or from IR reflectance. In this example, the flower has different visible colors and different reflectance in the IR. These visible colors and IR reflectance do not correspond to expected values for the reflectance of human skin. Thus, the flower object P1 can be discarded as a candidate. A variety of other techniques may also be used to eliminate peninsula objects as gesture candidates. For example, the size and geometry of the human hand can be characterized and the candidate objects compared to the various models of a human hand. Objects that do not match the models can be eliminated or considered unlikely gesture candidates. In this example, the left hand (P2) and right hand (P3) are successfully identified as candidate objects that may produce gestures. These candidate objects are tracked through their various motions.

Figure 4A:
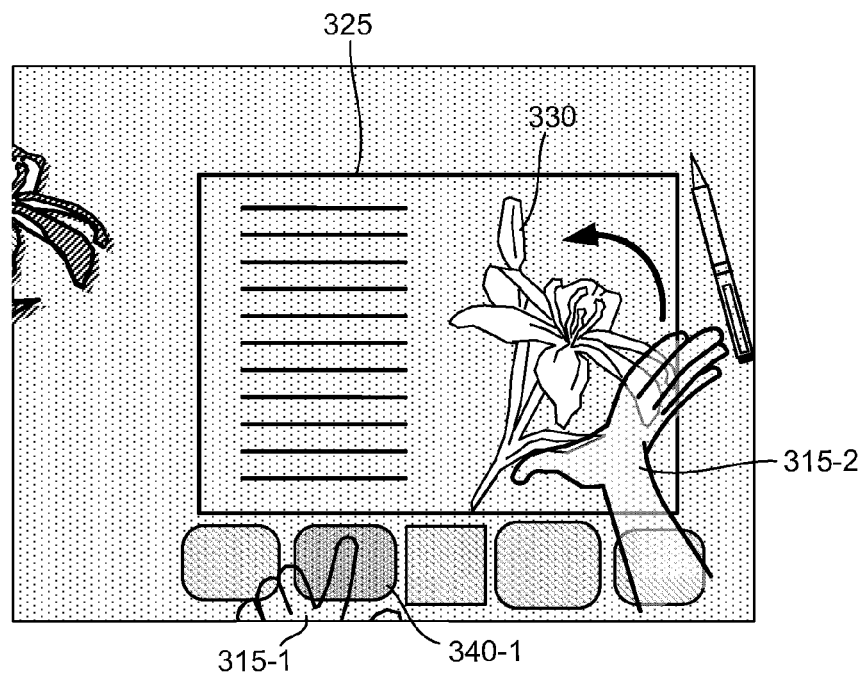
FIGS. 4A and 4B are diagrams of gestures sensed by HID system and resulting operations performed by the HID system, according to one example of principles described herein.
Figure 4B:
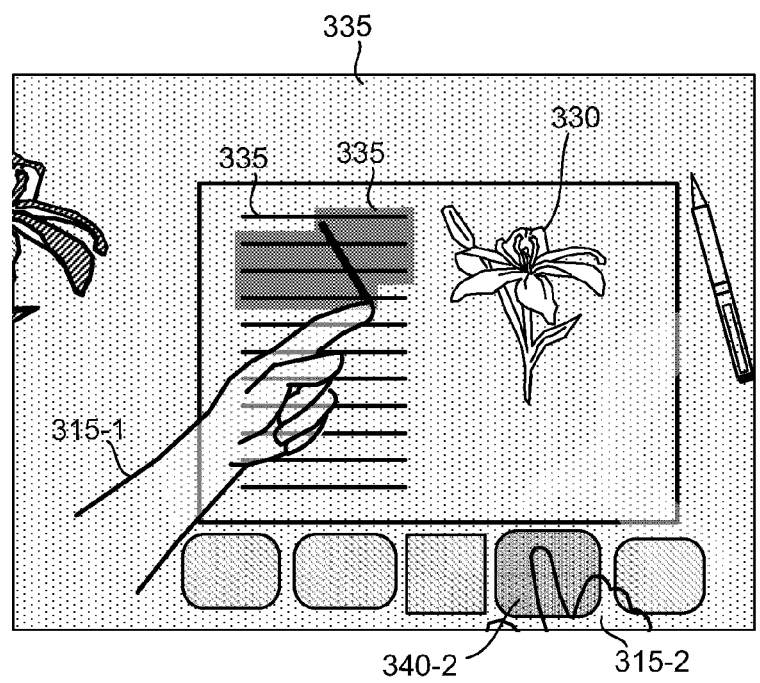

FIGS. 4A and 4B are diagrams of gestures sensed by the HID system and resulting operations performed by the HID system. In FIG. 4A, the user's left hand (315-1) has moved from its previous position to activate a projected control area and the user's right hand (315-2) is gesturing in the vicinity of the image of the flower. The projected control area (340-1) may indicate that the user wished to perform gesture based operations on the image of the flower. The user's right hand (315-2) makes a rotating gesture and also squeezes the fingers and thumb together. The HID system tracks these motions and compares the motions to a set of gesture templates that correspond to commands. The HID system matches the gestures of the right hand (315-2) to commands to rotate and shrink the image. The indication with the left hand that the user wishes to manipulate a picture serves the purpose of reducing the number of available gesture templates/commands for the HID system to match against the gestures. This can increase the accuracy of the HID system in making a match. However, the use of a button or other technique to indicate a subset of commands is not required. For example, the HID system may recognize that the right hand (315-2) is operating in the same region where the image (330) is projected and may give special weight to commands that manipulate images as it translates the gestures by the right hand into commands.

FIG. 4B shows the image of the flower has been reoriented and resized. The left hand of the user is now being used to highlight (335) a portion of the text (335). This is accomplished by dragging the forefinger of the left hand (315-1) over a portion of the text. The right hand (315-2) is activating a different projected button. For example, the projected button may indicate that the selections made are to be copied to a clip board, sent to a blog, searched on the internet, included in a presentation, or any of a number of various actions.

The examples given above are only to illustrate the principles described and are not limiting. A wide range of different gestures could be used and the configuration of the various elements and images could be adapted to a wide variety of situations. For example, instead of projected active areas, the HID system may respond to voice commands that can be used in conjunction with gestures.

Figure 5:
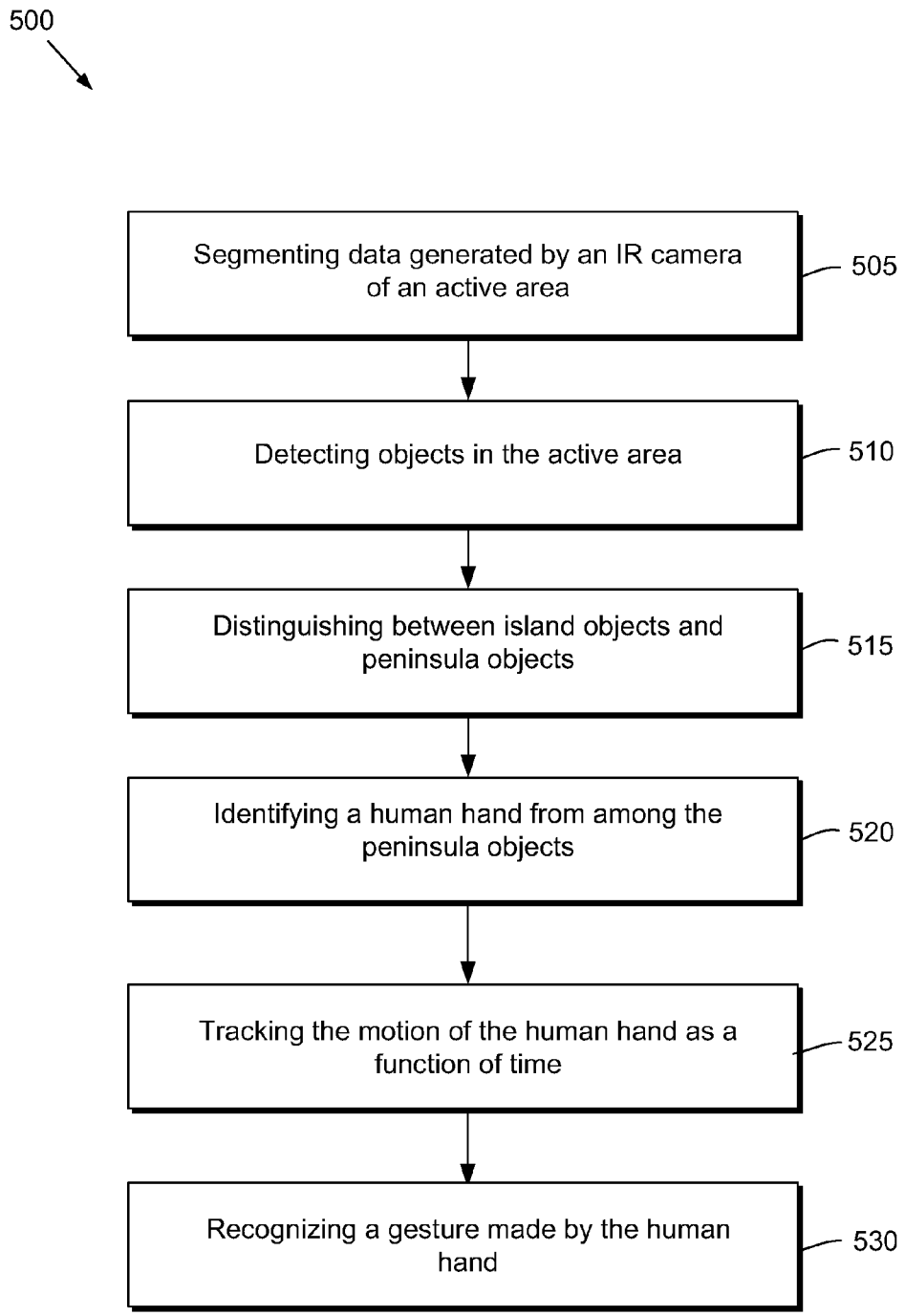
FIG. 5 is flow chart of a method for interacting with an application through a gesture based HID system, according to one example of principles described herein.

FIG. 5 is a flow chart of a method for interacting with an application through a gesture based HID system. The steps in the method are performed by one of more computational processors or other computing devices. Data, templates, operationally parameters, results, and other data products may be stored in volatile and/or nonvolatile computer memory. The method includes segmenting data generated by an IR camera of an active area (block 505). For example, segmenting data generated by the IR camera may include edge detection. Other data generated by the HID could also be used for edge detection. For example, data generated by the depth camera and visible camera could be segmented, separately or in combination with the data generated by the IR camera. In one example, segmenting data generated by the IR camera includes distinguishing light reflected from real objects and visible light projected by a projector. This can be accomplished in a number of ways including designing the IR detectors so that they are not sensitive to visible light or installing filters that reject visible light while allowing IR light to pass into the IR camera.

Objects within the active area are detected (block 510). This can be accomplished in a variety of ways, including comparing edges detected in an IR image with height contours detected by the depth camera. After the objects are identified, the objects are distinguished into two separate categories: island objects and peninsula objects (block 515). Identifying an object as an island object comprises determining that object has an edge that forms a complete perimeter within the active area. Identifying an object as a peninsula object may be done in a variety of ways including determining that an object edge intersects a border of the active area or determining that an object extends across a border of the active area.

At least one human hand is then identified from among the peninsula objects (block 520). In one example, identifying human hands can include illuminating the active area with at least one frequency of IR light and distinguishing human skin based on reflectance of at least one frequency of IR light. For example, the active area could be illuminated with two IR wavelengths, a first wavelength in which human skin has a relatively high IR reflectivity and a second wavelength in which human skin has a relatively low IR reflectivity. The reflectance of the various objects when illuminated with these IR wavelengths can then be compared to the expected reflectance values or range of values exhibited by human skin. Objects that perform similarly to human skin can be identified as human hands. Additionally, identifying a human hand may include comparing the size and geometry of peninsula objects to a skeletal model or shape descriptor that describes a human hand/arm. Objects identified as human hands in the active area are then tracked as a function of time (block 525). Gestures made by the human hand are recognized (block 530). The method may further include interpreting the gesture as an event, passing the event to an application, and execution of a command within the application as a function of the event.

Figure 6:
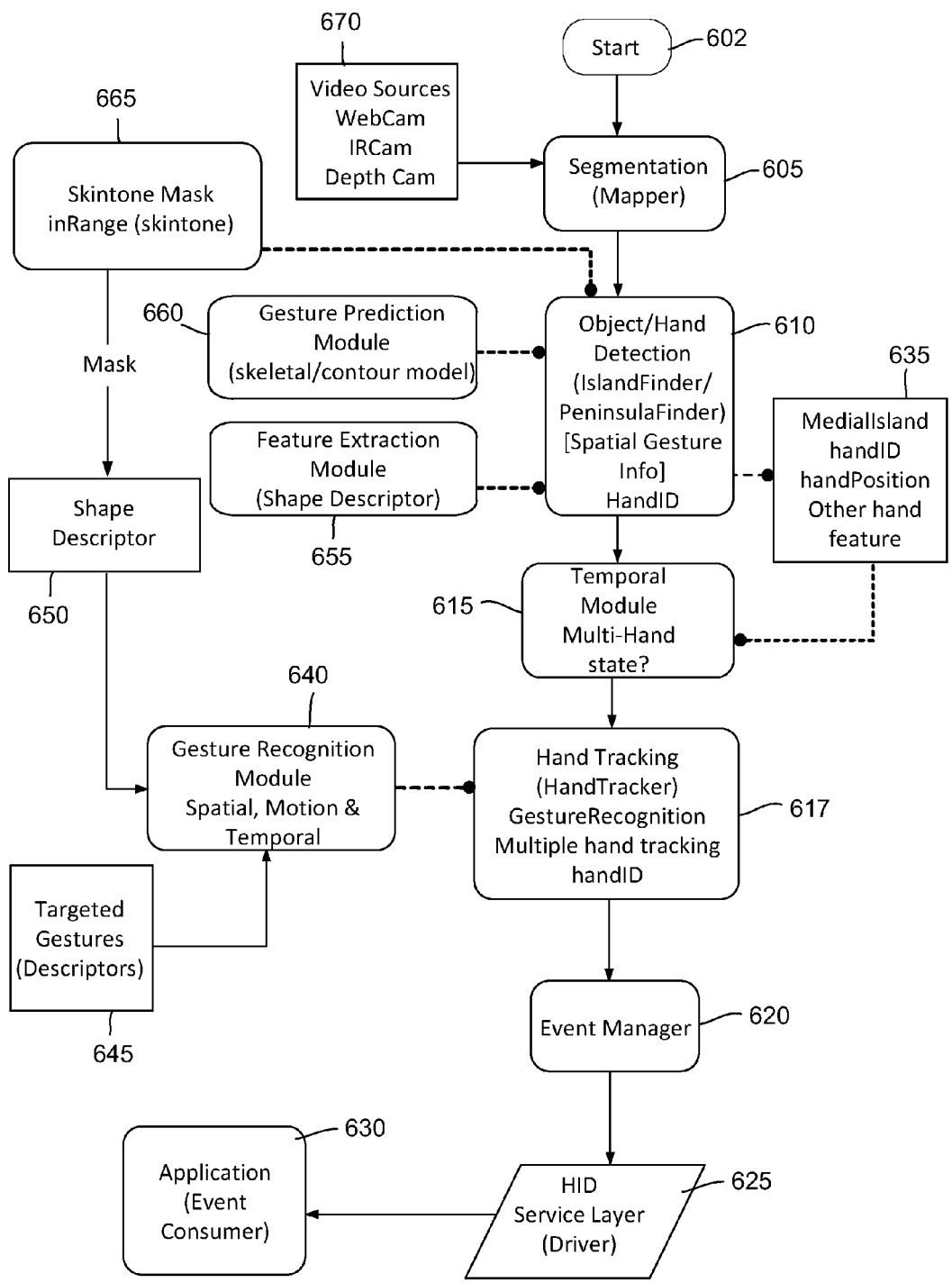
FIG. 6 is flow chart of method for interacting with an application through a gesture based HID system, according to one example of principles described herein.

FIG. 6 shows interaction between a number of modules and actions that are part of a gesture based HID system (600). A gesture is a hand "shape" that occurs in a specific internal of time. Gesture may be thought of as "static" or "dynamic." A static gesture conveys the intention of the user by maintaining a specific shape of the hand for period of time. For example, a static gesture may be making the "OK" sign by touching the forefinger to the thumb and extending the other fingers. Another static symbol may be the "thumbs up" gesture that is made by clinching the fingers and extending the thumb. These static gestures convey meaning without motion of the hand. Dynamic gestures include motions like moving a forefinger across a given portion of the active area to select text or pinching hands together to shrink the size of a picture. These dynamic gestures are more dependent on the motion of the hand as a function of time to communicate meaning.

Both static and dynamic gestures have three different temporal segments: preparation, a stroke, and retraction. Preparation includes preparatory movement that sets the hand in motion from some resting position. For static gestures, the preparatory motion may include moving the hand/fingers from an initial position to the gesture position. For example, moving the fingers of the hand from an open extended position to a clinched position is a preparatory motion to prepare to make the "thumbs up" gesture. For dynamic gestures, the hand may be repositioned over a particular portion of the active area as well as moving the fingers to a specific configuration.

The stroke is the intentional portion of the gesture where the user's meaning is communicated. For static gestures, the stroke is primarily static and includes holding the position of the hand for a period of time. For dynamic gestures, the motion of the hand as a function of time indicates the intention of the user. In many gestures, the trajectory and magnitude of the dynamic gesture may be important. For example, pinching the thumb and forefinger together can indicate that the user wants a picture to be reduced in size. The location of the fingers can indicate which picture is being resized and the amount that the thumb and forefingers are brought together can indicate the magnitude of the size reduction. The retraction of a gesture is a return to a resting position or repositioning for a new gesture. The retraction of a gesture indicates that the user has completed a given gesture.

In general, the system includes four portions: segmentation, spatial modeling of gestures, temporal modeling of gestures, and gesture recognition. As described below, segmentation includes defining portions of the images that contain gesture information. Spatial modeling of the gestures includes recognizing the geometry and features of the hand or hands making the gestures. Temporal modeling of the gestures includes tracking the changes in geometry and location of the hands as a function of time. Gesture recognition includes correlation of the spatial and temporal gesture information with gesture templates to identify a specific gesture. The gesture templates may be predefined or learned by the system over time.

The system starts (602) by acquiring data from a number of sources (670). In this example, the sources produce image data at video frame rates of approximately 24 to 30 frames per second. The video sources include a color camera (WebCam), an infrared camera (IRCam) and a depth camera (DepthCam). A segmentation module (605) acts as a mapper to separate objects from the background. As discussed above, the segmentation module (605) may operate on only a portion of the data received or on a combination of two or more sources.

After segmentation, an object/hand detection module (610) categorizes the segments as either island objects or peninsula objects. The object/hand detection module (610) can receive input from a variety of sources including a gesture prediction module (660) that includes skeletal/contour models of a human hand and arm. Using the data provided by the gesture prediction module (660), the object/hand detection module (610) can compare the identified objects to the skeletal and contour models to determine if the objects are hands. Other inputs to the object/hand detection module include a skintone mask (665). The skin tone mask may use a variety of data to identify exposed skin colors. For example, the skin tone mask may use the reflectance of human skin in the visible spectrum (as recorded by the WebCam) or in the infrared spectrum (as recorded by the IRCam). The skintone mask may produce a variable "inRange (skintone)" that identifies if light reflected from an object (or portions of an object) fall within a range that is indicative of human skin. The object/hand detection module (610) may also receive inputs from a feature extraction module (655). The feature extraction module may identify and extract various features from identified objects. For example, the feature extraction module may identify fingers on an object that has been identified as a hand. Using all or some of these inputs, the object/hand detection module identifies each object as either an island or a peninsula and then analyzes each peninsula to determine if it is a hand. The object/hand detection module (610) then outputs a variable "HandID" that identifies hands that are present in the active area. Using input from the gesture prediction module, the object/hand detection module may also output spatial gesture information. The analysis performed by the object/hand detection module (610) may be output as a number of parameters (635) such as island/peninsula identifiers, hand identifiers, hand positions, or other hand features.

These parameters are accepted by a temporal module (615). The temporal module (615) can make a number of actions, including determining if there are multiple hands present in the active area. The temporal module may identify the motion sequence, the speed of motion, pausing, start, stop, and other characteristics of a gesture. This allows the temporal module to use the spatial gesture information to identify potential preparation, stroke, and retraction actions. This temporal segmentation is used in matching a dynamic or static gesture made by the user to a known gesture.

The output from the temporal module is passed to the hand tracker module (617). The hand tracker module tracks the motion and position of the hands over time to identify gestures. The hand tracker module (617) receives information from a number of modules including the skintone mask module (665) that outputs a shape descriptor (650). The shape descriptor (650) is received by a gesture recognition module (640).

The gesture recognition module (640) may recognize gestures using a variety of techniques, such as skin tone, motion, shape (outline), three-dimensional modeling and other techniques. The gesture recognition module (640) may reference a targeted gestures library (645). The targeted gestures library may be a static library of all gestures that are recognized or may be a dynamic library that adapts to the context of the situation by presenting a reduced set of gestures that are expected. The targeted gestures library may include a number of gesture templates that define hand shapes that appear in recognized hand gestures. The information from the depth camera may be particularly useful in discriminating between different gestures because it includes three-dimensional location information for objects in the active area. The fingertips can be of particular interest as they are used to locate and touch objects or areas within the active area. The fingertip location(s) may be extracted based on hand shape characteristics such as the curvature and gaps in the hand contour. The gesture recognition module (640) combines these inputs and acts with the hand tracker (617) to produce outputs that identify gestures in combination with multiple hand tracking and hand identification information.

This data is passed to the event manager (620) that identifies specific events and/or commands that describe the intention of the user. The events are passed through an HID service layer (625) that acts as a driver or interface to an application (630) that consumes the events and makes appropriate changes within the application.

In conclusion, the gesture based human interfaces described above can more accurately discriminate real objects from projected images using an IR camera and/or depth camera. The IR camera and depth camera are unaffected by the projected images and consequently are able to produce data that more robustly identifies objects in the active area. The objects are categorized into island objects and peninsula objects. Island objects can be immediately disregarded, saving a significant amount of processing time and power. The peninsula objects are further analyzed to determine if they are human hands. Peninsula objects are human hands and are analyzed and tracked to identify gestures. These gestures are then translated into commands implemented by an application.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A method for implementing a human based interface comprising:
   segmenting, by a computing device, data generated by an IR camera of an active area;
   detecting, by a computing device, objects in the active area;
   distinguishing, by a computing device, between island objects and peninsula objects in the active area;
   identifying, by a computing device, a human hand from among the peninsula objects, wherein identifying a peninsula object comprises determining that an object intersects a border of the active area;
   tracking, by a computing device, motion of the human hand in the active area as a function of time; and
   recognizing, by a computing device, a gesture made by the human hand.

2. The method of claim 1, in which segmenting data comprises edge detection.

3. The method of claim 1, in which segmenting data further comprises segmenting data generated by a depth camera.

4. The method of claim 3, in which segmenting data comprises combining data from the IR camera, a visible camera and depth camera and operating on the combined data.

5. The method of claim 1, in which segmenting data comprises distinguishing light reflected from real objects and visible light projected by a projector onto the active area using data generated by the IR camera.

6. The method of claim 1, in which detecting objects in the active area comprises comparing edges detected from IR camera with height contours detected by the depth camera.

7. The method of claim 1, in which identifying an island object comprises determining that object has an edge that forms a complete perimeter within the active area.

8. The method of claim 1, in which detecting objects in the active area comprises:
- illuminating the active area with at a frequency of IR light; and
- distinguishing human skin based on reflectance of the frequency of IR light.

9. The method of claim 8, in which distinguishing human skin comprises comparison of two IR wavelengths, a first wavelength in which human skin has a higher IR reflectivity and a second wavelength in which human skin has a lower IR reflectivity.

10. The method of claim 1, further comprising:
- interpreting the gesture as a event;
- passing the event to an application; and
- execution of a command within the application as a function of the event.

11. A gesture based human interface system comprising:
- a projector to project an optical image over an active area;
- a color camera imaging objects in the active area and the optical image projected over the active area;
- infrared (IR) illumination;
- an IR camera sensitive to the IR illumination reflected off objects in the active area but not to the optical image projected over the active area;
- a computer processor to receive input from the IR and color cameras and process the data to distinguish between island objects and peninsula objects in the active area, to identify a human hand from among the peninsula objects, wherein the identifying of the peninsula object comprises determining that an object edge intersects a border of the active content, and to detect gestures by the human hand.

12. The system of claim 11, in which the IR illumination comprises a narrow waveband illumination in which human skin has a high reflectance and the IR camera comprises a filter to selectively pass the narrow waveband illumination reflected from human skin.

13. A computer program product for implementing a human based interface comprising:
- a non-transitory computer readable storage medium having computer readable program code embodied therewith, the computer readable program code comprising:
  - computer readable program code to segment data generated by an IR camera of an active area;
  - computer readable program code to detect objects in the active area;
  - computer readable program code to distinguish between island objects and peninsula objects in the active area; and
- computer readable program code to identify a human hand from among the peninsula objects, wherein identifying a peninsula object comprises determining that an object edge intersects a border of the active area.

* * * * *